Figure 1:
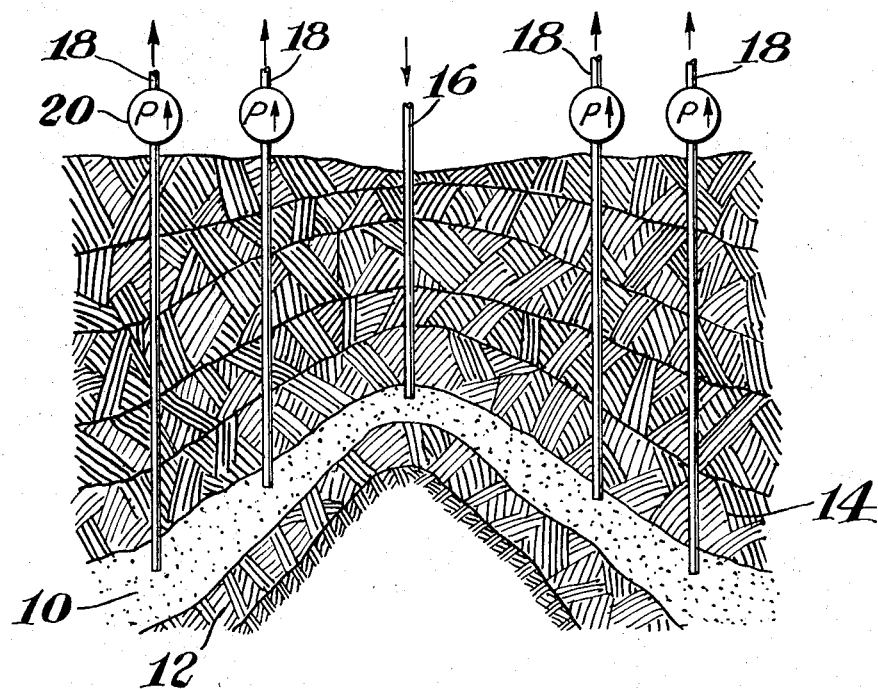

United States Patent
Stenger et al.

[15] 3,647,261
[45] Mar. 7, 1972

[54] PROCESS FOR SOLUTION MINING OF SILVER

[72] Inventors: Vernon A. Stenger; Walter R. Kramer, both of Midland, Mich.

[73] Assignee: The Dow Chemical Company, Midland, Mich.

[22] Filed: May 4, 1970

[21] Appl. No.: 34,419

[52] U.S. Cl. .............................299/4, 75/101 R, 75/101 BE, 75/112
[51] Int. Cl. .........................................E21b 43/28
[58] Field of Search ...................299/4, 5; 75/101 R, 101 BE, 75/108, 112, 118

[56] References Cited

UNITED STATES PATENTS

| | | | |
|---|---|---|---|
| 565,342 | 8/1896 | Frasch | 299/4 |
| 2,283,198 | 5/1942 | Fink et al. | 75/102 |
| 3,545,964 | 12/1970 | Hansen et al. | 75/101 R |
| 3,429,694 | 2/1969 | Lower | 75/101 BE UX |
| 3,473,921 | 10/1969 | Schmuckler | 75/101 BE UX |

Primary Examiner—Ernest R. Purser
Attorney—Griswold & Burdick, William R. Norris and Lloyd S. Jowanovitz

[57] ABSTRACT

Disclosed herein is a process for the in situ leaching of noble metal values from ores. The process comprises feeding into a subterranean stratum chlorinated aqueous brine having an oxidation potential of at least about 500 millivolts. Noble metal values are solubilized into the brine which is then recovered from the stratum. The process is relatively efficient and economical and can be performed without complex, time-consuming excavations or the accumulation of processed tailings.

8 Claims, 2 Drawing Figures

PATENTED MAR 7 1972 3,647,261

INVENTORS.
Vernon A. Stenger
Walter R. Kramer
BY
Griswold & Burdick
ATTORNEYS

PROCESS FOR SOLUTION MINING OF SILVER

The mining of silver and gold conventionally involves removing ore containing the desired metal values from its environment and transporting it to a remote processing site at which separation of the metals are accomplished. Because of the volumes of earth excavated and accumulations of residual tailings, the whole process leaves the earth in an unsightly and dangerous condition.

It is therefore a principle object of the invention to provide a novel method of mining silver and gold. Another object is to provide an efficient in situ leaching process. A third object is to provide a leaching process which utilizes economical and readily available chloride brines. Other objects and advantages of the instant invention stem from the fact that the process obviates the excavation and removal of large quantities of ore from the earth and thereby avoids the unsightly craters and piles of ore tailings associated with previous conventional mining processes.

SUMMARY OF THE INVENTION

The present invention is based upon the realization and combination of several important factors. First, it was conceived by applicant that appreciable gold or silver-bearing ore deposits exist which are sufficiently permeable and are so situated (in relation to a relatively impermeable stratum) that the noble metal values present in the ores can be leached away and recovered; i.e., in situ mining methods would be feasible with such ores, if a suitable extracting solvent was available. Secondly, it has been discovered that an extracting solvent suitable for this purpose is provided in the form of a chlorinated aqueous brine. With such a system, the amounts of oxidizing agent (chlorine or NaOCl) required are sufficiently small in relation to various impurities and to the noble metal values obtained, that the noble metal values can be efficiently recovered by in situ leaching.

Figure 2:
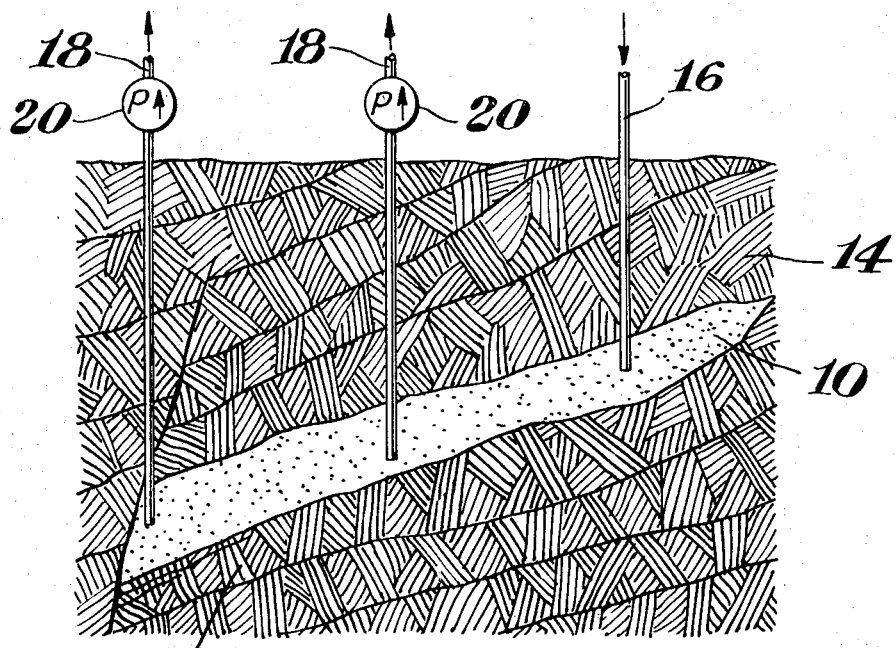

In the drawing,

FIGS. 1 and 2 show a schematic vertical section taken through a geological formation possessing a stratum containing noble metal values. The formation is penetrated by inlet wells and outlet wells in accordance with the present invention.

DESCRIPTION OF INVENTION EMBODIMENT

The invention is a process comprising feeding into a subterranean ore stratum a chlorinated aqueous brine solution having an oxidation potential of at least about 500 millivolts, thereby solubilizing noble metal values such as silver values into the brine, and recovering the brine from the stratum. The noble metal values can be recovered by contacting the brine with hydrogen sulfide to precipitate silver or gold sulfides. Where extraneous metal values such as lead, copper, or zinc are also leached into the brine, these should be recovered from the brine prior to sulfide precipitation. This is accomplished, for example, by contacting the brine with an appropriate ion exchange resin.

"Feeding" of brine into suitable subterranean deposits can be accomplished in a variety of ways. With reference to the drawing (FIGS. 1 and 2) a body of ore 10 is chosen which extends over several elevations. The ore stratum 10 is situated over a relatively impermeable stratum 12 and is overlaid with a stratum 14 which may be permeable or relatively impermeable to the brine. An input or "feeder" well 16 is bored into one or more of the higher portions of the deposit. When fed into the deposit, the brine will tend to flow because of gravitational force toward the lower portions of the deposit where it can be collected. Suitable collection means would include outlet wells 18 penetrating into the lower lying portions of the ore deposit. If necessary, the collection of outlet wells 18 are fitted with pumping means 20. If the difference in elevation between the upper and lower portions of the ore deposit is sufficiently great, pumping means may not be required.

Where the ore deposit is situated substantially at one elevation so that brine cannot be made to flow through the deposit by force of gravity, it may be desirable to employ pressurized driving means, e.g., a brine fluid pressure may be allowed to build up by pumping, or water under pressure may be used to "push" the brine through the deposit. It is possible to treat deposits having permeability as low as 10 millidarcys by use of fluid pressure buildup or other driving means. Permeability may also be improved by underground fracturing techniques such as are employed in the oil industry although it is desirable that the brine pass through the ore itself rather than through cracks in the ore.

Brines employed in the invention are preferably characterized in that before being placed in contact with silver or gold ore, they possess an oxidation potential of at least about 500 millivolts. Generally, the brine oxidation potential is from about 800 to about 1,200 millivolts. As used herein, the term "oxidation potential" is defined as the potential developed by a noble metal electrode immersed in the leaching solution, as measured against a saturated calomel electrode connected with the same solution through a "salt bridge." The measurement of potential may be made with the aid of any common laboratory-type millivolt meter which does not draw enough current to significantly alter the potential being determined. Usually platinum is employed as the noble metal, but other metals such as gold or tungsten may be used.

Appropriate oxidation potentials are produced, for example, by introducing chlorine or alkali metal hypochlorite (e.g., NaOCl) into the brine. From about 5 to about 3,000 parts per million (p.p.m.) of "dissolved" chlorine are generally sufficient to produce sufficient brine oxidation potentials.

While the above discussion has concentrated on brine oxidation potential before the brine is contacted with the ore, (i.e., "beginning" oxidation potential), it is also desirable to maintain a "residual" oxidation potential in the brine. As recovered, the loaded brine should possess an oxidation potential of at least about 200 millivolts. Preferably, the "residual" oxidation potential is at least about 500 millivolts. To increase the residual brine oxidation potential, the oxidation potential of the entering brine (i.e., the beginning oxidation potential) is increased.

Frequently oxidizable impurities such as organic matter, ferrous iron, or sulfides are present in the ore stratum and will reduce the oxidation potential of brine as it passes through. However, once such impurities are oxidized, the oxidation potential of the brine entering the ore stratum can be somewhat decreased without greatly diminishing the residual oxidation potential of the recovered brine.

Due to solubility limitations of chlorine in brine, it is desirable, when the oxidation potential is produced by contacting the brine with chlorine or NaOCl, that the brine temperature not exceed about 80° C. Preferably, the brine temperature will not exceed about 60° C. Brine temperatures should also not be allowed to fall below about 0° C. When the brine temperature is less than about 10° C., the solubility of silver values in the brine is impaired. At brine temperatures below about 0° C., the solubility of the brine salt may be reduced to undesirably low levels, i.e., the solubility of calcium chloride in water is reduced to about 36 percent by weight of the brine at −10° C. At −22° C., ice will form in a saturated sodium chloride brine. Mixtures of these salts, such as are present in naturally occurring brines, can also be employed. Preferably, brines employed will be substantially saturated with respect to the inorganic salt component. However, dilute brines containing as little as 10 percent by weight of inorganic salt as solute can be employed. For example, the invention can utilize brines containing as little as 10 weight percent of NaCl or as little as 10 weight percent of $CaCl_2$. However, the more dilute the leaching solution is, the lower will be the leaching rate.

The present invention is applicable to a wide variety of gold and silver-bearing ores characterized as having a permeability of at least about 10 millidarcys. Preferably, the ore permeability will be as high as 50 millidarcys. The term is defined as one one-thousandth of a darcy, where the darcy is the coefficient of flow expressed in gallons per day passing through a section 1 square foot in area under a hydraulic head of 1 foot for each linear foot to be traversed, at 60° F. (e.g., (e.g., The permeability of a stratum is determined as described in the Handbook of Applied Hydrology, V. T. Chow, McGraw-Hill N. Y. (1964), Section 13, pp. 10–12.

Strata utilizable in the present invention have a thickness (as measured vertically) of from less than about 1 foot up to several hundred feet. Additionally, the strata contain at least about 1 ounce of recoverable noble metal values (e.g., AgCl, $Ag_2S$, $Ag_2CO_3$, Au, AuTe) per ton of ore. The ratio by weight of oxidizable iron compounds (e.g., $FeCO_3$, FeS, all calculated as Fe) to noble metal values should not exceed about 400:1. Preferably, the ratio is within the range of from about 200:1 to about 10:1.

Also, it is preferred that the ore contain less than about 10 pounds of oxidizable organic matter per ounce of noble metal values. The term "oxidizable organic matter" refers to carbonaceous substances capable of reacting with chlorine, or chlorine and water, under the process conditions employed in the present invention. Such organic matter would include, for example, substances residual from marine organisms, humus, etc., deposited with the rock during the sedimentation period in which it was formed.

Examples of strata having the above-described characteristics are certain strata deposited during the carboniferous era, e.g., silver-bearing formations of "black" limestone occurring in Nevada and Montana, as well as some coarse sandstones such as the sandstone "reefs" found in the region around Leeds, Utah. Alluvial deposits such as those found along the upper reaches of the Arkansas River in Colorado may be suitable. Also, the invention may be employed to recover traces of gold values from beds of detrital gypsum similar to those at the White Sands National Monument.

The subterranean stratum underlying the silver-bearing ore should be relatively impermeable, i.e., the stratum should have a permeability of less than about 5 millidarcys. Suitable impermeable strata would include, for example, igneous and metamorphic formations such as granite, lava, and recrystallized or compacted sandstone. Numerous clays and fine-grained siltstones would also suffice as the impermeable stratum. It is preferred that overlying stratum also be relatively impermeable, particularly where a pressurized driving means is used to push brine through the ore stratum.

The following Example is set forth to illustrate the present invention:

A chloridized sodium chloride brine having an oxidation potential of about 1,000 millivolts is prepared by bubbling chlorine gas into water which is substantially saturated with respect to sodium chloride.

With reference to FIG. 1, the brine is fed into a subterranean silver-bearing formation 10 consisting of an elevated portion having portions contiguous thereto which are of lesser elevation. The elevated portion of the stratum is penetrated with an inlet or feeder well 16, and the lower portions of the stratum are penetrated with a plurality of "outlet" wells 18. All of the wells extend vertically downward from the surface into the silver-bearing stratum 10. However, the outlet wells 18 terminate at lower levels of the stratum than does the feeder well 16.

The formation contains about 15 to 25 ounces of silver values per ton of ore. The silver values to be recovered are mainly silver chloride but contain some silver sulfide ($Ag_2S$). In addition, the ore contains some copper and iron values. The copper values are present both as carbonates and as sulfides. The active iron is mainly ferrous carbonate and ferrous sulfides (FeS and $FeS_2$). Iron in the form of hematite, magnetite or insoluble silicates does not interfere since it does not dissolve in the oxidizing solution. The permeability of the ore stratum 10 is about 50 millidarcys.

The permeable silver-bearing stratum 10 is situated immediately above a relatively impermeable igneous stratum 12 having a permeability of about 3 millidarcys. The brine is allowed to percolate through the permeable stratum 10 and is collected and pumped to the surface through the "outlet" wells 18.

Brine recovered from outlet wells contains from about 50 to 200 p.p.m. of solubilized silver values and has a residual oxidation potential of less than about 600 millivolts. The brine also contains somewhat larger amounts of iron and copper values (primarily as chlorides).

The iron is separated by contacting the brine with an anion exchange resin in chloride form. The solubilized silver and copper values are not retained on the resin. Where present, lead and zinc values are also removed by contacting with the anion exchange resin. Suitable resins include those of strongly basic character prepared such as from copolymers of styrene with about 4 percent each of ar-ethylvinylbenzene and divinylbenzene, chloromethylated and caused to react with trimethylamine to form quaternary ammonium functional groups. A resin of this character will retain the chloro complexes of ferrous iron, lead and zinc in strong chloride (brine) solution. The chloro complexes can later be decomposed by passing water through the resin whereupon the lead, zinc, and iron are removed as soluble chlorides. If lead is high, the water should be heated.

After leaving the resin, the brine contains mainly (in addition to sodium chloride) silver and copper values. These are precipitated by contacting the brine with hydrogen sulfide. Alternatively, a water-soluble sulfide such as sodium or potassium sulfide can be used. The precipitated copper and silver values are then separated by known techniques.

The depleted brine is aerated to reduce the concentration of $H_2S$ therein and is contacted with gaseous chlorine to raise the oxidation potential of the brine to 1,000 millivolts. The "reactivated" brine is than recycled into contact with the subterranean silver-bearing ore.

What is claimed is:

1. A process consisting of (a) feeding a chlorinated aqueous brine into a permeable subterranean ore stratum containing silver values, thereby solublizing the silver values into the brine, and (b) recovering silver chloride containing brine with a residual oxidation potential of at least about 200 millivolts from the stratum.

2. A process as in claim 1 wherein the brine comprises sodium chloride.

3. A process as in claim 1 wherein the brine comprises calcium chloride.

4. A process as in claim 1 wherein the brine employed is a naturally occurring solution comprising the chlorides of alkaline and alkaline earth elements in water.

5. A process as in claim 1 wherein the subterranean stratum contains at least 1 ounce of silver values per ton of ore and wherein the ratio by weight of oxidizable iron compounds to silver values does not exceed 400:1.

6. A process as in claim 1 comprising (a) feeding the brine into the ore stratum by injection through an inlet well penetrating the stratum, and (b) collecting silver chloride containing brine from an outlet well penetrating the same stratum.

7. A process as in claim 1 and including the subsequent step of contacting the brine with the chloride form of an anion exchange resin containing quaternary ammonium functional groups.

8. A process as in claim 7 and including the subsequent step of contacting the brine with hydrogen sulfide to precipitate silver values.

* * * * *

PO-1050
(5/69)

UNITED STATES PATENT OFFICE
CERTIFICATE OF CORRECTION

Patent No. 3,647,261      Dated 7 March 1972

Inventor(s) Vernon A. Stenger and Walter R. Kramer

It is certified that error appears in the above-identified patent and that said Letters Patent are hereby corrected as shown below:

Column 2, line 73, insert --millidarcy-- between "term" and "is".

line 74, insert --(0.001)-- between "one-thousandth" and "of".

Column 3, line 2, delete "(e.g.,(e.g.,".

Signed and sealed this 29th day of August 1972.

(SEAL)
Attest:

EDWARD M. FLETCHER, JR.
Attesting Officer

ROBERT GOTTSCHALK
Commissioner of Patents